United States Patent
Yoon (10) Patent No.: US 9,537,130 B2
(45) Date of Patent: *Jan. 3, 2017

(54) BATTERY MODULE

(71) Applicants: SAMSUNG SDI CO., LTD., Yongin-si, Gyeonggi-do (KR); ROBERT BOSCH GMBH, Stuttgart (DE)

(72) Inventor: Ji-Hyeong Yoon, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 165 days.

This patent is subject to a terminal disclaimer.

(21) Appl. No.: 14/186,739

(22) Filed: Feb. 21, 2014

(65) Prior Publication Data

US 2014/0234677 A1    Aug. 21, 2014

(30) Foreign Application Priority Data

Feb. 21, 2013 (KR) ........................ 10-2013-0018618

(51) Int. Cl.
*H01M 2/10* (2006.01)
*H01M 2/12* (2006.01)

(52) U.S. Cl.
CPC ............ *H01M 2/12* (2013.01); *H01M 2/1077* (2013.01); *H01M 2/1094* (2013.01); *H01M 2/1211* (2013.01)

(58) Field of Classification Search
None
See application file for complete search history.

(56) References Cited

U.S. PATENT DOCUMENTS

| 3,704,440 | A | 11/1972 | Bradley |
| 4,248,944 | A | 2/1981 | Smilanich |
| 5,688,612 | A | 11/1997 | Mrotek et al. |
| 8,828,588 | B2 * | 9/2014 | Lim ........................ H01M 2/12 |
| | | | 429/100 |
| 2007/0134524 | A1 | 6/2007 | Cho et al. |
| 2007/0154781 | A1 | 7/2007 | Choi |
| 2008/0145754 | A1 | 6/2008 | Partington et al. |
| 2009/0061289 | A1 | 3/2009 | Hamada et al. |
| 2010/0104941 | A1 * | 4/2010 | Nakabayashi ........... H01G 9/10 |
| | | | 429/181 |

(Continued)

FOREIGN PATENT DOCUMENTS

| EP | 2 381 507 A1 | 0/2011 |
| JP | 07-059204 | 3/1995 |

(Continued)

OTHER PUBLICATIONS

U.S. Office action dated Aug. 2, 2013, for cross reference U.S. Appl. No. 13/067,356, (now U.S. Pat. No. 8,828,588), (24 pages).

(Continued)

*Primary Examiner* — Jonathan Crepeau
(74) *Attorney, Agent, or Firm* — Lewis Roca Rothgerber Christie LLP (57) ABSTRACT

A battery module including a plurality of battery cells aligned in a direction, each of the battery cells including a cap plate including a terminal portion, and a vent portion to exhaust a gas; a cover covering the vent portions; and a heat-resistance member between the battery cells and the cover, and having an opening formed in a region corresponding to each vent portion.

18 Claims, 9 Drawing Sheets

(56) References Cited

U.S. PATENT DOCUMENTS

| | | |
|---|---|---|
| 2011/0117401 A1 | 5/2011 | Lee et al. |
| 2011/0151301 A1 | 6/2011 | Kim |
| 2011/0151311 A1* | 6/2011 | Lee .................... H01M 2/1077 429/156 |
| 2011/0212348 A1 | 9/2011 | Yasui et al. |
| 2012/0094156 A1* | 4/2012 | Lim .................... H01M 2/12 429/82 |
| 2013/0004813 A1* | 1/2013 | Kim .................... H01M 2/1077 429/87 |
| 2013/0143082 A1* | 6/2013 | Kim .................... H01M 2/1077 429/82 |
| 2013/0236754 A1* | 9/2013 | Lim .................... H01M 2/12 429/82 |

FOREIGN PATENT DOCUMENTS

| | | |
|---|---|---|
| JP | 2002-151025 | 5/2002 |
| JP | 2003-100274 | 4/2003 |
| JP | 2006-049136 | 2/2006 |
| JP | 2009-170258 | 7/2009 |
| JP | 2010-055957 A | 3/2010 |
| JP | 2010-205509 | 9/2010 |
| JP | 2010-277736 | 9/2010 |
| JP | 2012-113896 | 6/2012 |
| KR | 10-2001-0037119 | 5/2001 |
| KR | 2002-0001982 | 1/2002 |
| KR | 10-2009-0128602 | 12/2009 |
| KR | 10-2011-0060960 | 6/2011 |
| KR | 10-2011-0070199 A | 6/2011 |
| KR | 10-2011-0100473 | 9/2011 |

OTHER PUBLICATIONS

U.S. Office action dated Feb. 6, 2014, for cross reference U.S. Appl. No. 13/067,356, (now U.S. Pat. No. 8,828,588), (16 pages).

Patent Abstracts of Japan, and English machine translation of Japanese Publication 2009-170258 dated Jul. 30, 2009, listed above, (23 pages).

Patent Abstracts of Japan, and English machine translation of Japanese Publication 2010-205509 dated Sep. 16, 2010, listed above, (18 pages).

U.S. Office action dated Jul. 17, 2014, for cross reference U.S. Appl. No. 13/759,002, (14 pages).

U.S. Office action dated Apr. 8, 2015, for cross reference U.S. Appl. No. 13/759,002, (10 pages).

EPO Search Report dated Jun. 21, 2013 corresponding to European Patent application 13155810.8, (6 pages).

English machine translation of Japanese Publication 2010-277736 dated. Sep. 12, 2010, (15 pages).

English translation of Korean Notice of Allowance dated Aug. 31, 2012, for Korean Patent application 10-2010-0099846 (1 pg.).

English translation of KIPO Office action dated Dec. 30, 2011, for Korean Patent application 10-2010-0099846 (6 pgs.).

English machine translation of Japanese Publication 2012-113896 dated Jun. 14, 2012, listed above, (16 pages).

\* cited by examiner

BATTERY MODULE

CROSS-REFERENCE TO RELATED APPLICATION

This application claims priority to and the benefit of Korean Patent Application No. 10-2013-0018618, filed on Feb. 21, 2013 in the Korean Intellectual Property Office, the entire content of which is incorporated herein by reference.

BACKGROUND

1. Field

Aspects of embodiments of the present invention relate to a battery module.

2. Description of the Related Art

A high-power battery module using a non-aqueous electrolyte with high energy density has recently been developed. The high-power battery module is configured as a large-capacity battery module manufactured by connecting a plurality of battery cells in series and which may be used for driving devices, such as motors of electric vehicles and the like, which require high power.

A battery cell includes an electrode assembly and an electrolyte, and the electrode assembly is composed of positive and negative electrode plates. The battery cell generates energy by an electrochemical reaction of the electrode plates and the electrolyte. In this case, high-temperature gas may be generated inside the battery cell due to a side reaction of the electrochemical reaction.

SUMMARY

According to an aspect of embodiments of the present invention, a battery module is capable of preventing or substantially preventing damage or deformation caused by high-temperature gas generated in a plurality of battery cells. According to another aspect of embodiments of the present invention, a battery module has improved heat resistance.

According to one or more embodiments of the present invention, a battery module includes; a plurality of battery cells aligned in a direction, each of the battery cells including a cap plate including a terminal portion, and a vent portion to exhaust a gas; a cover covering the vent portions; and a heat-resistance member between the battery cells and the cover, and having an opening formed in a region corresponding to each vent portion.

The battery module may further include an insulation member between the vent portions and the cover.

The heat-resistance member may be arranged between the insulation member and the battery cells.

The heat-resistance member may include first and second heat-resistance members respectively provided on a top and a bottom of the insulation member.

The heat-resistance member may include a partition wall along a circumference of the opening and having a thickness and a height.

The partition wall may face the vent portion.

The heat-resistance member may cover top surfaces of the battery cells.

The heat-resistance member may include a terminal hole through which the terminal portion is exposed.

The heat-resistance member may include at least one of $Al_2O_3$, $SiO_2$, CaO, MgO, $B_2O_3$, or $Fe_2O_3$.

The cover may have a shape of a hexahedron having one surface open in one direction, and may be mounted on the battery cells such that the open surface of the cover faces the vent portions.

The cover may be in close contact with the insulation member to form a gas flow path.

The cover may have an exhaust port connected to the gas flow path at one side of the cover.

As described above, according to an aspect of embodiments of the present invention, a battery module has a novel heat-resistance member.

Accordingly, a battery module according to embodiments of the present invention is capable of preventing or substantially preventing damage or deformation caused by high-temperature gas generated in a plurality of battery cells.

BRIEF DESCRIPTION OF THE DRAWINGS

The accompanying drawings, together with the specification, illustrate some exemplary embodiments of the present invention, and, together with the description, serve to explain aspects and principles of the present invention.

DETAILED DESCRIPTION

In the following detailed description, certain exemplary embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it may be directly on the another element or indirectly on the another element with one or more intervening elements interposed therebetween. Also, when an element is referred to as being "connected to" another element, it may be directly connected to the another element or indirectly connected to the another element with one or more intervening elements connected therebetween. Like reference numerals refer to like elements.

A battery module according to an embodiment of the present invention is described below with reference to FIGS. 1 to 3.

Figure 1:
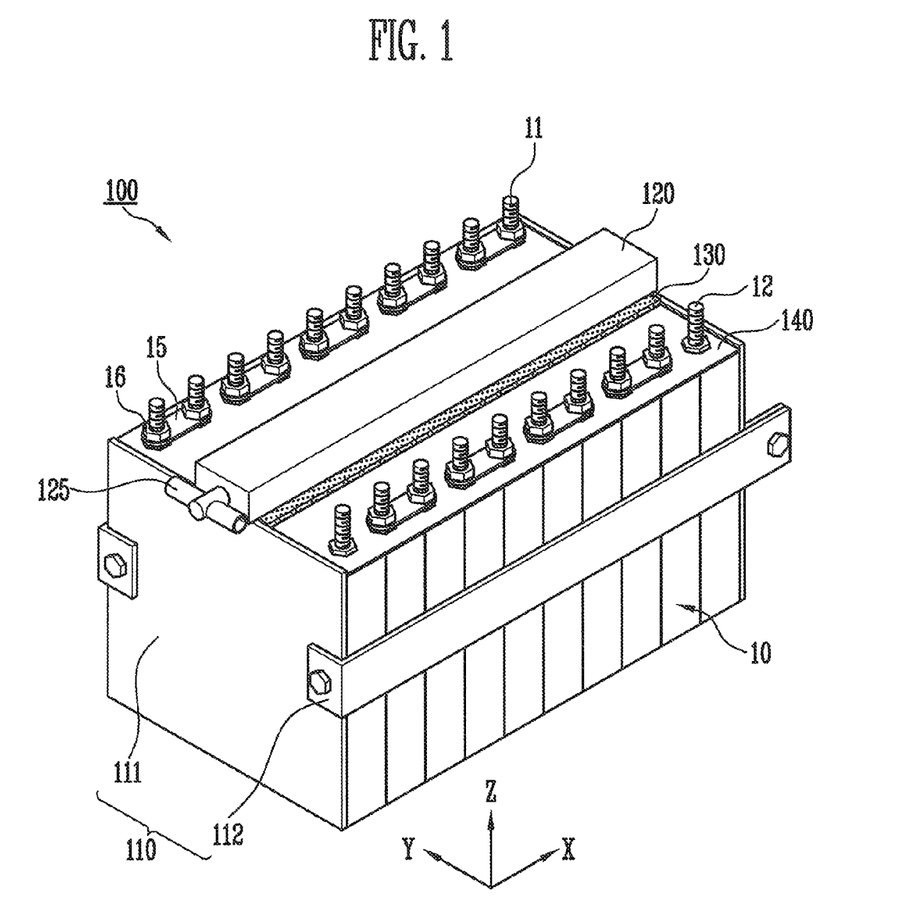
FIG. 1 is a perspective view of a battery module according to an embodiment of the present invention.

FIG. 1 is a perspective view of a battery module according to an embodiment of the present invention. FIG. 2 is an exploded perspective view of the battery module of FIG. 1. FIG. 3 is a perspective view of a heat-resistance member of the battery module of FIG. 1.

Figure 2:
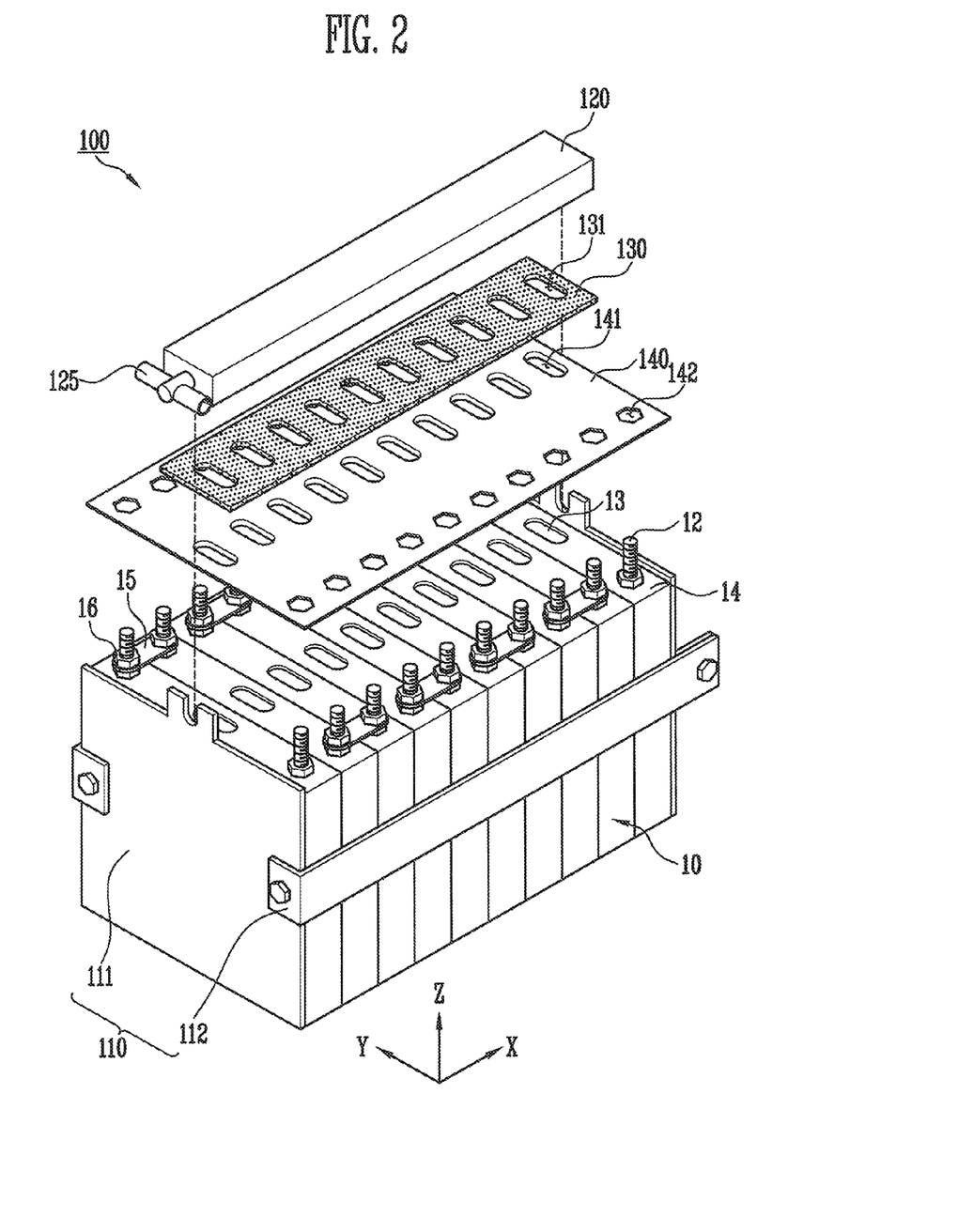
FIG. 2 is an exploded perspective view of the battery module of FIG. 1.

Referring to FIGS. 1 and 2, a battery module 100 according to an embodiment of the present invention includes a plurality of battery cells 10 aligned in one direction, and each including a cap plate 14 having positive and negative electrode terminal portions 11 and 12, and a vent portion 13 through which gas may be exhausted; a cover 120 covering the vent portions 13; and a heat-resistance member 140 provided between the battery cells 10 and the cover 120, and having a vent opening 141 formed in a region corresponding to each vent portion 13. In one embodiment, the heat-resistance member 140 has a plurality of the vent openings 141, each of the vent openings 141 being at a region corresponding to one of the vent portions 13.

In one embodiment, the battery module 100 further includes an insulation member 130 provided between the vent portions 13 and the cover 120. The heat-resistance member 140, according to one embodiment, is provided on the bottom of the insulation member 130, that is, between the insulation member 130 and the battery cells 10.

The cover 120, in one embodiment, has a shape of a hexahedron having one surface open in one direction. The cover 120 is mounted on the battery cells 10 such that the open surface of the cover 120 faces the vent portions 13. In one embodiment, the cover 120 has an exhaust port 125 for exhausting gas, provided at one end thereof. The cover 120 defines a gas flow path connected to the exhaust port 125 by being in close contact with the insulation member 130.

The heat-resistance member 140, according to one embodiment, has a shape covering top surfaces of the battery cells 10. The heat-resistance member 140 may be made of a material including at least one of $Al_2O_3$, $SiO_2$, CaO, MgO, $B_2O_3$, or $Fe_2O_3$. The heat-resistance member 140, in one embodiment, is configured to withstand a temperature of 100 to 1300° C.

Accordingly, in a case in which a high-temperature gas is degassed and exhausted from the vent portion 13 of the battery cell 10, the heat-resistance member 140 prevents or substantially prevents the cover 120 or the insulation member 130 from being damaged or deformed by the high-temperature gas.

As the battery cell 10 is charged/discharged, gas may be generated as a residual product of electrode plates and an electrolyte. The gas may be exhausted through the vent portion 13. The gas is exhausted to the outside of the battery module 100 through the exhaust port 125 of the cover 120. In one embodiment, the exhaust port 125 is formed in a T-shape of which left and right sides are open, such that the gas exhausted through the exhaust port 125 may not affect adjacent battery modules 100. However, in other embodiments, a shape of the exhaust port 125 is not limited to a T-shape.

In one embodiment, the insulation member 130 may be a gasket which is made of a heat-resistant material so as to prevent or substantially prevent leakage of gas. As the battery cell 10 is charged/discharged, heat is generated from the battery cell 10. In this case, the plurality of battery cells 10 may generate heat, and the generated heat may otherwise melt an insulation member mounted to the battery cells 10. In a case where an insulation member is melted as described above, the sealing ability between the insulation member and the cover 120 is decreased, and, therefore, the gas may be leaked.

In one embodiment, an outer case of the battery cell 10 is formed of a metal, and the cover 120 is formed of a plastic resin. When the battery cell 10 and the cover 120 contact each other and are formed of different materials, the contact between the battery cell 10 and the cover 120 is not easy. In addition, the gas may be leaked at a portion where the contact between the battery cell 10 and the cover 120 is weak. In order to prevent or substantially prevent such a problem, the insulation member 130 that is a gasket is provided between the battery cells 10 and the cover 120. Thus, the sealing performance between the battery cells 10 and the cover 120 can be easily maintained by the insulation member 130.

The insulation member 130, in one embodiment, is formed as a single body, such that the insulation member 130 can concurrently (e.g., simultaneously) seal the vent portions 13 of the plurality of battery cells 10. In this case, a plurality of openings 131 corresponding to the respective vent portions 13 may be provided in the insulation member 130. The size of the opening 131, in one embodiment, is no less than that of the vent portion 13. If the size of the opening 131 is greater than that of the vent portion 13, the insulation member 130 may not come in direct contact with the high-temperature gas exhausted from the vent portion 13, and thus it is less likely that the insulation member 130 may be melted.

The battery cell 10, in one embodiment, may include a battery case having an open region, and a cap plate 14 sealing the open region. The battery case accommodates an electrode assembly and an electrolyte therein. The electrode assembly is composed of a positive electrode plate, a negative electrode plate, and a separator interposed between the positive and negative electrode plates. In one embodiment, the positive and negative electrode terminal portions 11 and 12 connected to the positive and negative electrode plates are provided to protrude outward at both ends of the cap plate 14, respectively. The positive and negative electrode plates constituting the electrode assembly generate energy by reacting with the electrolyte, and the generated energy is transferred to the outside of the battery cell 10 through the positive and negative electrode terminal portions 11 and 12.

In a case in which the pressure of gas generated inside the battery cell 10 is greater than or equal to a reference pressure (e.g., a predetermined value) the vent portion 13 provided between the positive and negative electrode terminal portions 11 and 12 of the cap plate 14 may perform the function of a passage through which the gas is exhausted from the battery cell 10. Thus, the vent portion 13 prevents or substantially prevents the battery cell 10 from being broken or ruptured by the internal pressure of the battery cell 10.

According to one embodiment, a plurality of the battery cells 10 may be aligned in one direction. In one embodiment, the battery cells 10 are aligned in parallel with one another such that wide front surfaces of the battery cells 10 face each other. The vent portion 13, in one embodiment, is provided at a central portion of each battery cell 10. The vent portions 13, in one embodiment, are arranged on an approximately straight line along the battery cells 10. The positive and negative electrode terminal portions 11 and 12 of two adjacent battery cells 10 may be electrically connected to each other through a bus bar 15 formed of metal. The bus bar 15 may be fixed to the positive and negative electrode terminal portions 11 and 12 using a member such as a nut 16.

A housing 110 accommodating the battery cells 10 therein may include a pair of end plates 111 provided to be spaced apart from each other in one direction, and one or more side brackets 112 connecting the pair of end plates 111 to each other. The plurality of battery cells 10 may be accommodated between the pair of end plates 111.

The end plates 111, in one embodiment, are arranged in surface contact with the outermost battery cells 10, respectively, of the plurality of battery cells 10. Thus, the pair of end plates 111 may apply pressure to the plurality of battery cells 10 toward the inside of the plurality of battery cells 10.

The side brackets 112 are connected to the pair of end plates 111 so as to support both surfaces of the plurality of battery cells 10.

Figure 3:
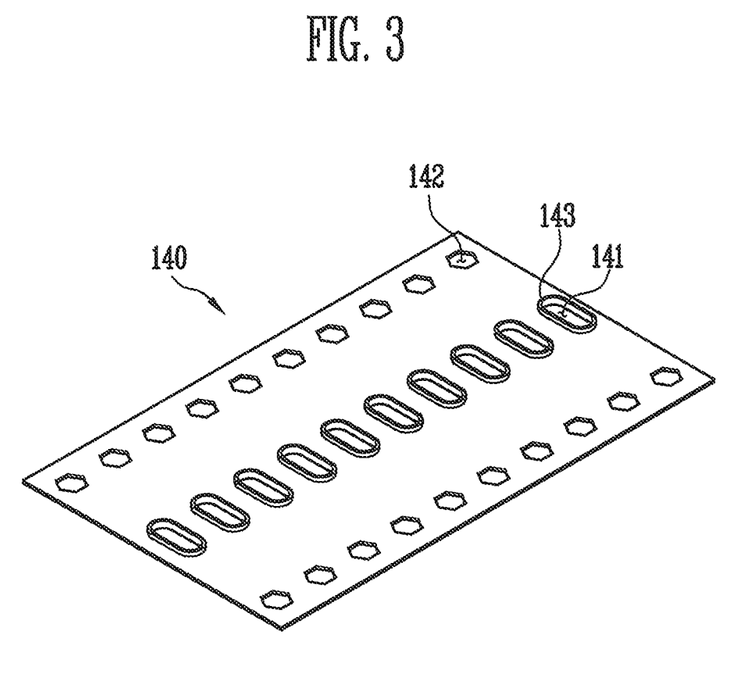
FIG. 3 is a perspective view of a heat-resistance member of the battery module of FIG. 1.

Referring to FIG. 3, in one embodiment, the vent openings 141 and terminal holes 142 are formed in the heat-resistance member 140. The vent opening 141 is formed in a region corresponding to the vent portion 13, and the terminal hole 142 is formed in a region corresponding to the positive or negative electrode terminal portion 11 or 12 (see FIG. 1) of the battery cell 10. The terminal holes 142 are formed in the heat-resistance member 140 such that the positive and negative electrode terminal portions 11 and 12 can be exposed therethrough. In addition, the heat-resistance member 140 can be mounted on the cap plates 14.

In one embodiment, a partition wall 143 is further provided to the heat-resistance member 140. The partition wall 143, in one embodiment, is formed along the circumference of each vent opening 141 and has a thickness and height (e.g., a predetermined thickness and height). In one embodiment, the heat-resistance member 140 is mounted on the battery cell 10 such that the partition wall 143 faces the vent portion 13. In one embodiment, the partition wall 143 of the heat-resistance member 140 is disposed so as to be adjacent to the opening 131 of the insulation member 130, i.e. to contact the insulation member 130 at an outline of the opening 131. In one embodiment, the partition wall 143 of the heat-resistance member 140 is formed to surround the outline of the opening 131 of the insulation member 130, such that the insulation member 130 does not come in direct contact with the high-temperature gas exhausted from the vent portion 13. Accordingly, it is less likely that the insulation member 130 may be melted.

A battery module according to another embodiment of the present invention is described below with reference to FIGS. 4 and 5.

Figure 4:
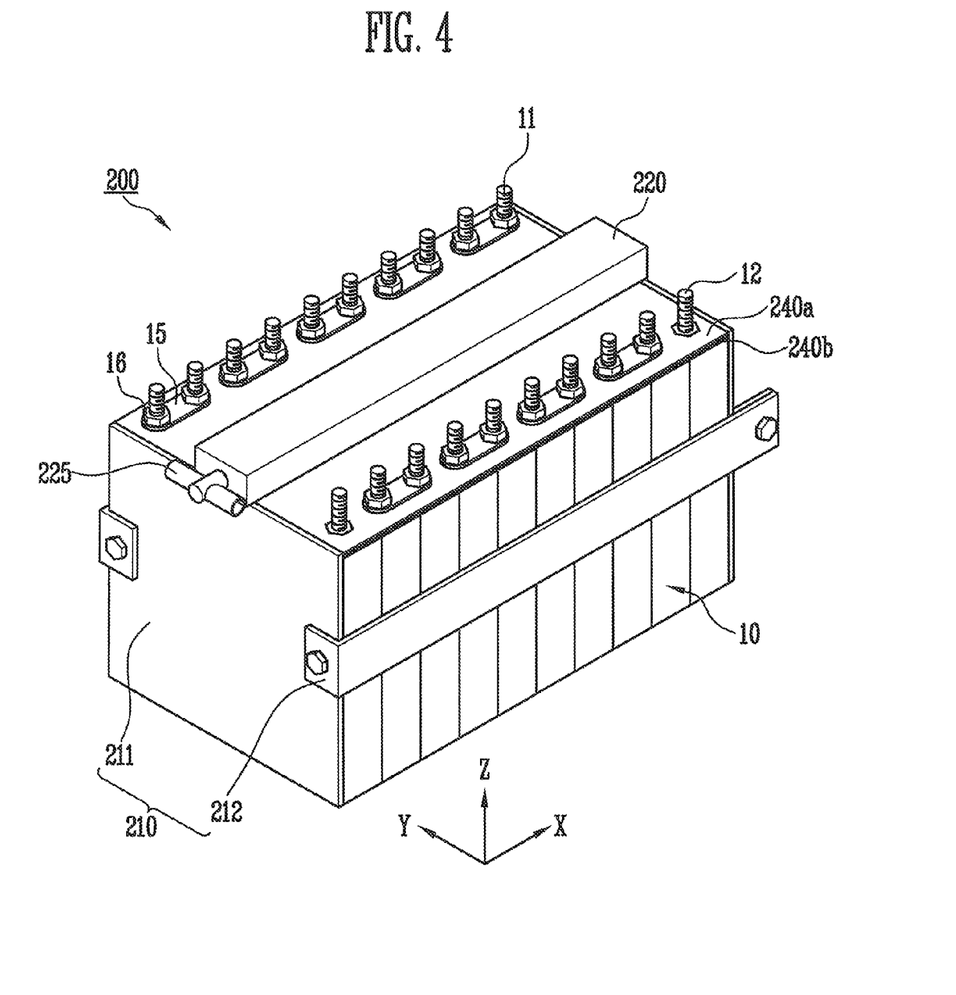
FIG. 4 is a perspective view of a battery module according to another embodiment of the present invention.

FIG. 4 is a perspective view of a battery module according to another embodiment of the present invention. FIG. 5 is an exploded perspective view of the battery module of FIG. 4.

Figure 5:
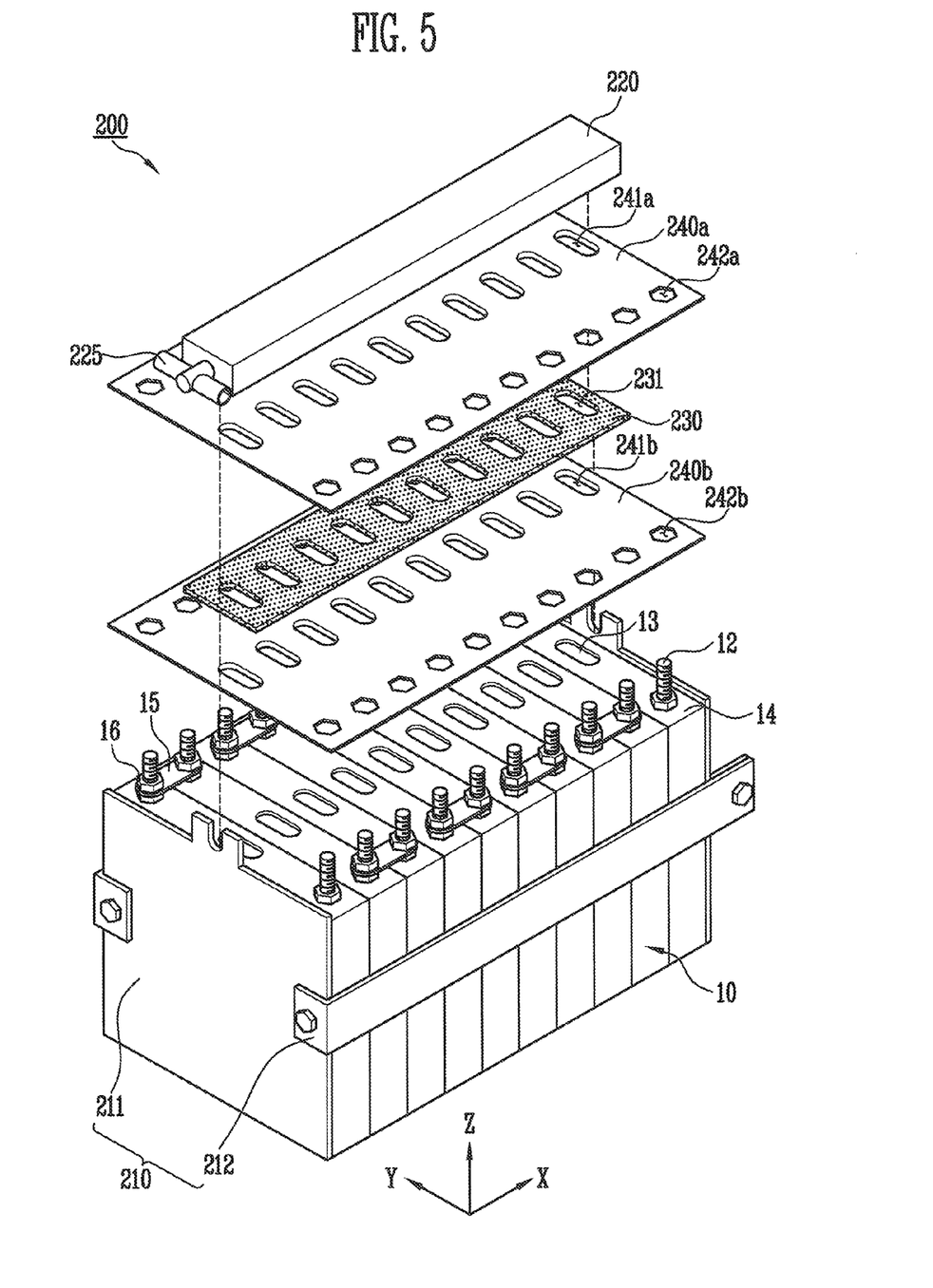
FIG. 5 is an exploded perspective view of the battery module of FIG. 4.

Referring to FIGS. 4 and 5, a battery module 200 according to another embodiment of the present invention includes a plurality of the battery cells 10 aligned in one direction, and each including the cap plate 14 having the positive and negative electrode terminal portions 11 and 12, and the vent portion 13 through which gas may be exhausted; a cover 220 covering the vent portions 13; and first and second heat-resistance members 240a and 240b provided between the battery cells 10 and the cover 220, and respectively having first and second vent openings 241a and 241b formed in a region corresponding to each vent portion 13. In one embodiment, the first and second heat-resistance members 240a and 240b each has a plurality of the respective vent openings 241a and 241b, each of the vent openings 241a and 241b being at a region corresponding to one of the vent portions 13. In one embodiment, the battery module 200 further includes an insulation member 230 provided between the vent portions 13 and the cover 220. In one embodiment, the first and second heat-resistance members 240a and 240b are respectively provided on the top and bottom of the insulation member 230.

The cover 220, in one embodiment, has a shape of a hexahedron having one surface open in one direction. The cover 220 is mounted on the battery cells 10 such that the open surface of the cover 220 faces the vent portions 13. In one embodiment, the cover 220 has an exhaust port 225 for exhausting gas, provided at one end thereof. The cover 220 defines a gas flow path connected to the exhaust port 225 by being in close contact with the insulation member 230.

In one embodiment, the insulation member 230 is interposed between the first and second heat-resistance members 240a and 240b and has a shape covering top surfaces of the battery cells 10. The first and second heat-resistance members 240a and 240b may be made of a material including at least one of $Al_2O_3$, $SiO_2$, $CaO$, $MgO$, $B_2O_3$, or $Fe_2O_3$. The first and second heat-resistance members 240a and 240b, in one embodiment, are configured to withstand a temperature of 100 to 1300° C.

Accordingly, in a case in which a high-temperature gas is degassed and exhausted from the vent portion 13 of the battery cell 10, the first and second heat-resistance members 240a and 240b prevent or substantially prevent the cover 220 or the insulation member 230 from being damaged or deformed by the high-temperature gas.

The insulation member 230, in one embodiment, is formed as a single body, such that the insulation member 230 can concurrently (e.g., simultaneously) seal the vent portions 13 of the plurality of battery cells 10. In this case, a plurality of openings 231 corresponding to the respective vent portions 13 may be provided in the insulation member 230. The size of the opening 231, in one embodiment, is no less than that of the vent portion 13. If the size of the opening 231 is greater than that of the vent portion 13, the insulation member 230 may not come in direct contact with the high-temperature gas exhausted from the vent portion 13, and thus it is less likely that the insulation member 230 may be melted.

A housing 210 accommodating the battery cells 10 therein may include a pair of end plates 211 provided to be spaced apart from each other in one direction, and one or more side brackets 212 connecting the pair of end plates 211 to each other. The plurality of battery cells 10 may be accommodated between the pair of end plates 211.

The end plates 211, in one embodiment, are arranged in surface contact with the outermost battery cells 10, respectively, of the plurality of battery cells 10. Thus, the pair of end plates 211 may apply pressure to the plurality of battery cells 10 toward the inside of the plurality of battery cells 10. The side brackets 212 are connected to the pair of end plates 211 so as to support both surfaces of the plurality of battery cells 10.

In one embodiment, first vent openings 241a and first terminal holes 242a are formed in the first heat-resistance member 240a, and second vent openings 241b and second terminal holes 242b are formed in the second heat-resistance member 240b. The first and second vent openings 241a and 241b are formed in a region corresponding to the vent portion 13, and the first and second terminal holes 242a and 242b are formed in a region corresponding to the positive or negative electrode terminal portion 11 or 12 (see FIG. 4) of the battery cell 10. The first and second terminal holes 242a and 242b are respectively formed in the first and second heat-resistance members 240a and 240b such that the positive and negative electrode terminal portions 11 and 12 can be exposed therethrough. In addition, the first and second heat-resistance members 240a and 240b can be mounted on the cap plates 14.

In one embodiment, although not shown in the drawings, similar to the partition wall 143 shown in FIG. 3, first and second partition walls (not shown) may be further provided to the first and second heat-resistance members 240a and 240b, respectively. In one embodiment, the first or second partition walls may be formed along the circumference of each of the first or second vent portions 241a or 241b, and may have a thickness and height (e.g., a predetermined thickness and height). In one embodiment, the first heat-resistance member 240a is disposed such that the first partition wall faces the insulation member 230, and the second heat-resistance member 240b is disposed such that the second partition wall faces the vent portions 13. In one embodiment, the first partition wall is disposed to be adjacent to the opening 231 of the insulation member 230 (e.g., to contact the insulation member 230 at an outline of the opening 231). In one embodiment, the first partition wall of the first heat-resistance member 240a is formed to surround the outline of the opening 231 of the insulation member 230, such that the insulation member 230 does not come in direct contact with the high-temperature gas exhausted from the vent portion 13. Accordingly, it is less likely that the insulation member 230 may be melted. However, unlike the configuration described above, the second partition wall of the second heat-resistance member 240b may also be disposed to face the opening 231 of the insulation member 230.

A battery module according to another embodiment of the present invention is described below with reference to FIGS. 6 and 7.

Figure 6:
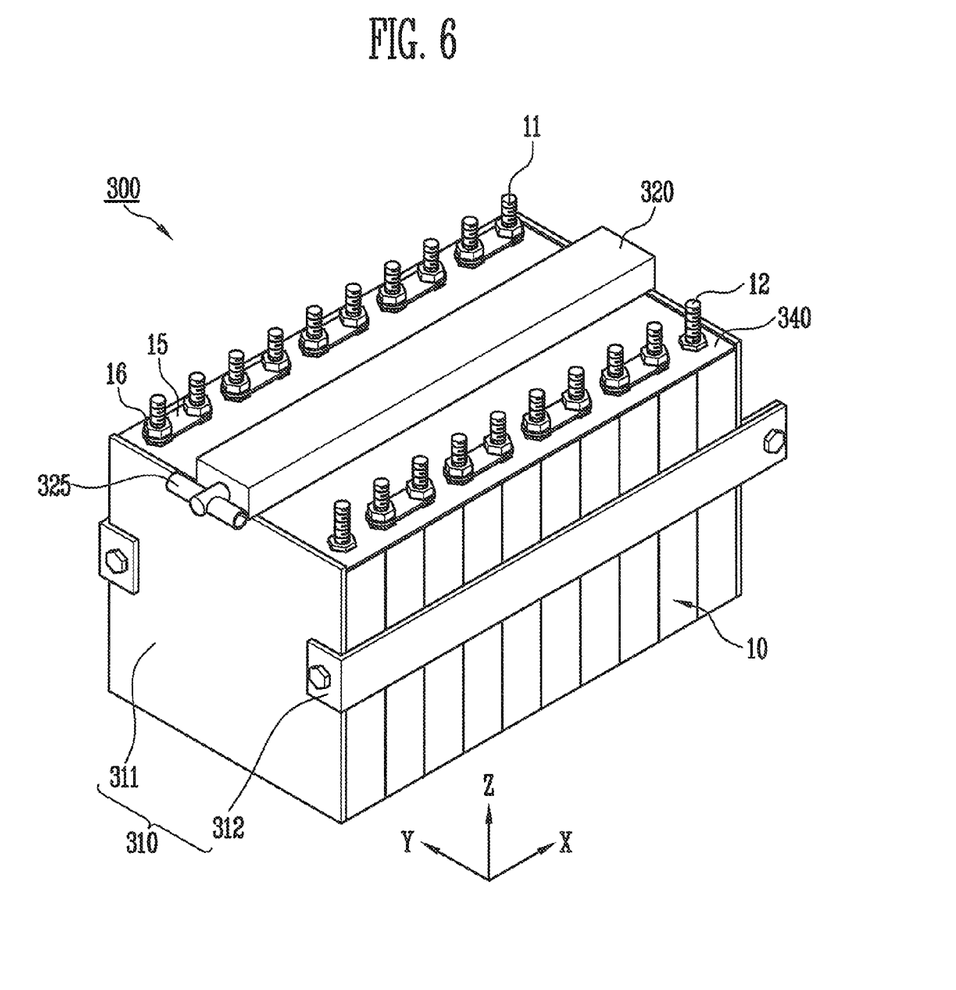
FIG. 6 is a perspective view of a battery module according to another embodiment of the present invention.

FIG. 6 is a perspective view of a battery module according to another embodiment of the present invention. FIG. 7 is an exploded perspective view of the battery module of FIG. 6.

Figure 7:
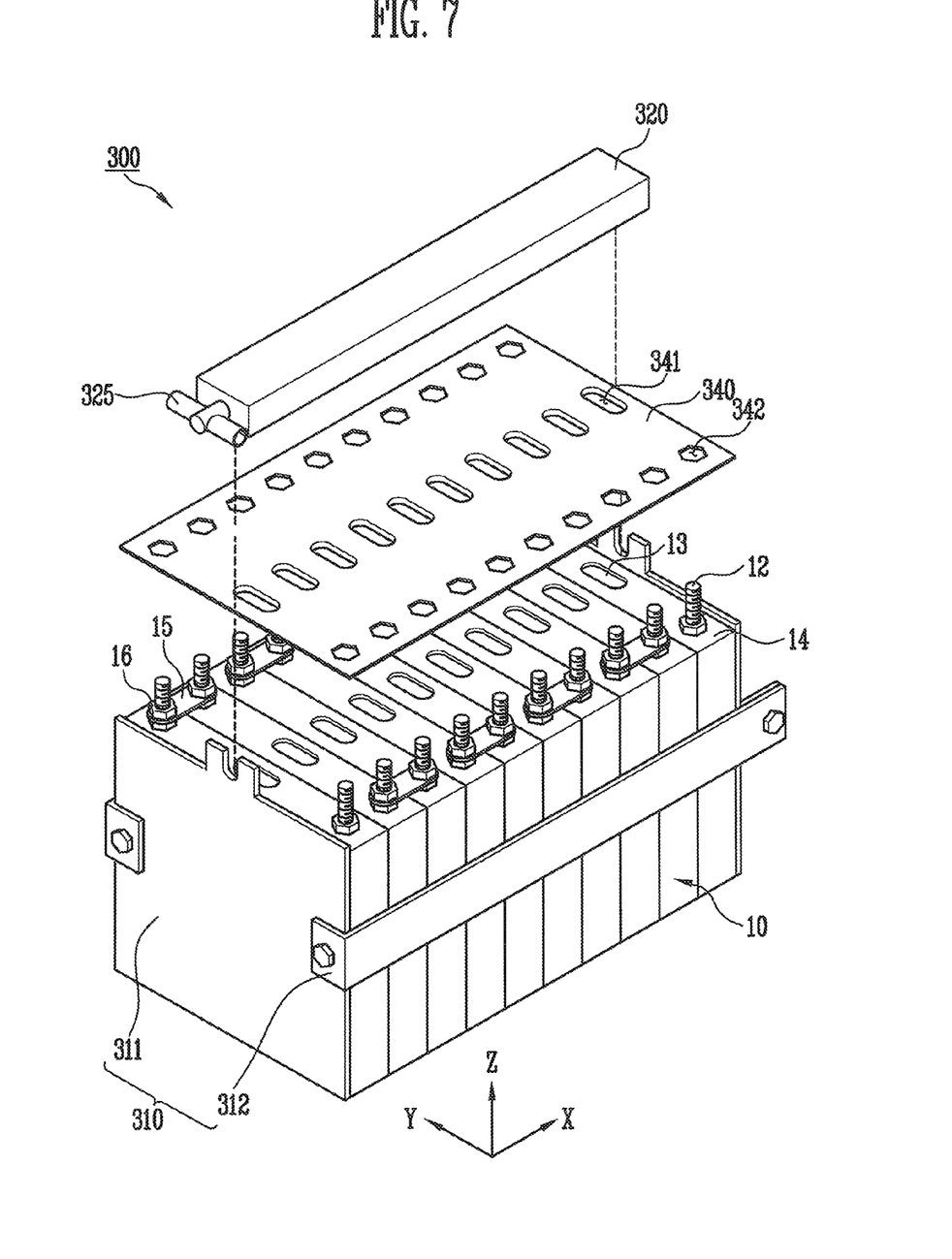
FIG. 7 is an exploded perspective view of the battery module of FIG. 6.

Referring to FIGS. 6 and 7, a battery module 300 according to another embodiment of the present invention includes a plurality of the battery cells 10 aligned in one direction, and each including the cap plate 14 having the positive and negative electrode terminal portions 11 and 12, and the vent portion 13 through which gas may be exhausted; a cover 320 covering the vent portions 13; and a heat-resistance member 340 provided between the battery cells 10 and the cover 320, and having a vent opening 341 formed in a region corresponding to each vent portion 13. In one embodiment, the heat-resistance member 340 has a plurality of the vent openings 341, each of the vent openings 341 being at a region corresponding to one of the vent portions 13. The battery module 300 according to one embodiment does not have the insulation member 130 or 230 described above with respect to the battery modules 100, 200. Thus, the heat-resistance member 340 of the battery module 300 is provided on the top of the cap plate 14 of the battery cell 10.

The cover 320, in one embodiment, has a shape of a hexahedron having one surface open in one direction. The cover 320 is mounted on the battery cells 10 such that the open surface of the cover 320 faces the vent portions 13. In one embodiment, the cover 320 has an exhaust port 325 for exhausting gas, provided at one end thereof. The cover 320 defines a gas flow path connected to the exhaust port 325 by being in close contact with the heat-resistance member 340.

The heat-resistance member 340, according to one embodiment, has a shape covering top surfaces of the battery cells 10. The heat-resistance member 340 may be made of a material including at least one of $Al_2O_3$, $SiO_2$, $CaO$, $MgO$, $B_2O_3$, or $Fe_2O_3$. The heat-resistance member 340, in one embodiment, is configured to withstand a temperature of 100 to 1300° C.

Accordingly, in a case in which a high-temperature gas is degassed and exhausted from the vent portion 13 of the battery cell 10, the heat-resistance member 340 prevents or substantially prevents the cover 320 from being damaged or deformed by the high-temperature gas.

A housing 310 accommodating the battery cells 10 therein may include a pair of end plates 311 provided to be spaced apart from each other in one direction, and one or more side brackets 312 connecting the pair of end plates 311 to each other. The plurality of battery cells 10 may be accommodated between the pair of end plates 311.

The end plates 311, in one embodiment, are arranged in surface contact with the outermost battery cells 10, respectively, of the plurality of battery cells 10. Thus, the pair of end plates 311 may apply pressure to the plurality of battery cells 10 toward the inside of the plurality of battery cells 10. The side brackets 312 are connected to the pair of end plates 311 so as to support both surfaces of the plurality of battery cells 10.

In one embodiment, vent openings 341 and terminal holes 342 are formed in the heat-resistance member 340. The vent opening 341 is formed in a region corresponding to the vent portion 13, and the terminal hole 342 is formed in a region corresponding to the positive or negative electrode terminal portion 11 or 12 (see FIG. 6) of the battery cell 10. The terminal holes 342 are formed in the heat-resistance member 340 such that the positive and negative electrode terminals 11 and 12 can be exposed therethrough. In addition, the heat-resistance member 340 can be mounted on the cap plates 14.

Although not shown in the drawings, similar to the partition wall 143 shown in FIG. 3, a partition wall (not shown) may be further provided to the heat-resistance member 340 according to one embodiment. The partition wall, in one embodiment, is formed along the circumference of each vent opening 341, and has a thickness and height (e.g., a predetermined thickness and height). In one embodiment, the heat-resistance member 340 is mounted on the battery cell 10 such that the partition wall faces the vent portion 13. In one embodiment, the partition wall of the heat-resistance member 340 is disposed so as to be adjacent to the vent opening 341 of the heat-resistance member 340, i.e., to contact the outline of the vent opening 341. In one embodiment, the partition wall of the heat-resistance member 340 is formed to surround the outline of the vent opening 341 thereof, and thus the heat-resistance member 340 does not come in direct contact with the high-temperature gas exhausted from the vent portion 13. Accordingly, it is less likely that the heat-resistance member 340 may be melted.

A battery module according to another embodiment of the present invention is described below with reference to FIGS. 8 and 9.

Figure 8:
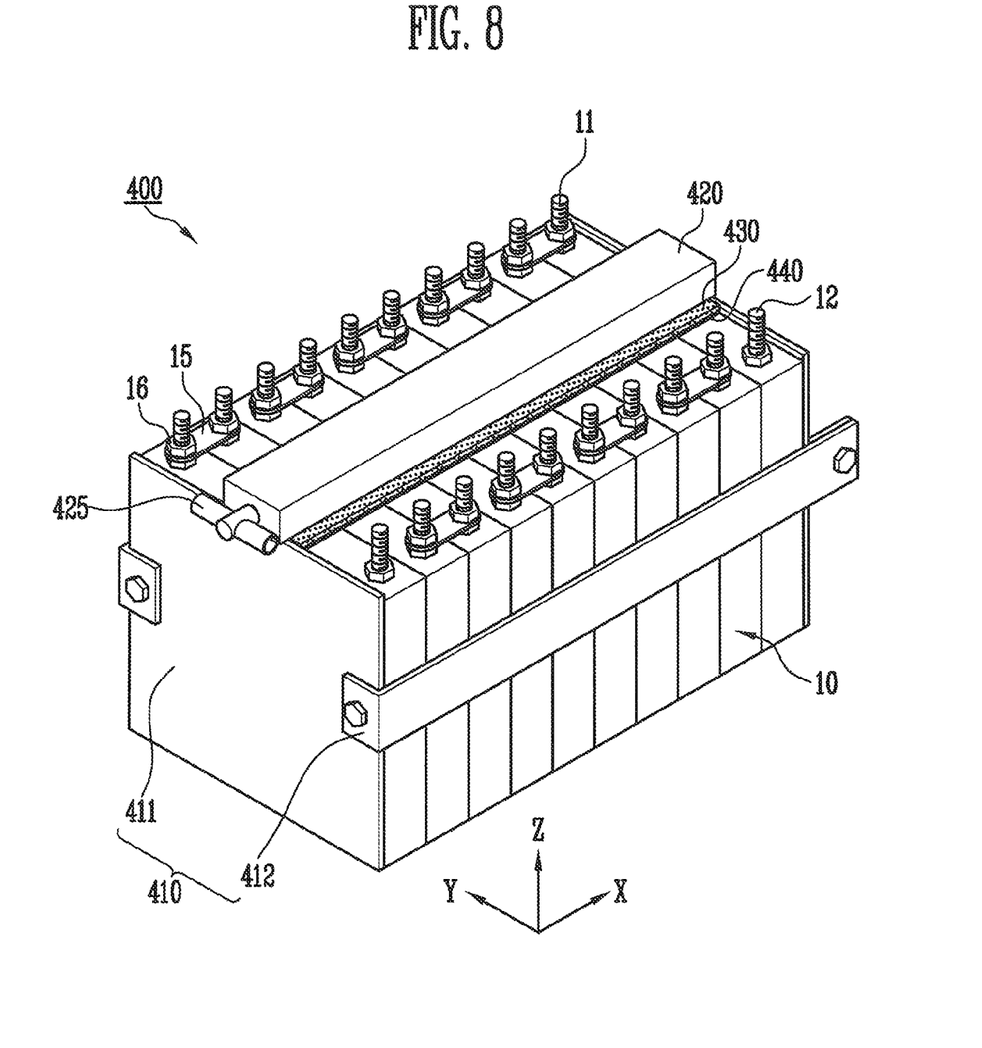
FIG. 8 is a perspective view of a battery module according to another embodiment of the present invention.

FIG. 8 is a perspective view of a battery module according to another embodiment of the present invention. FIG. 9 is an exploded perspective view of the battery module of FIG. 8.

Figure 9:
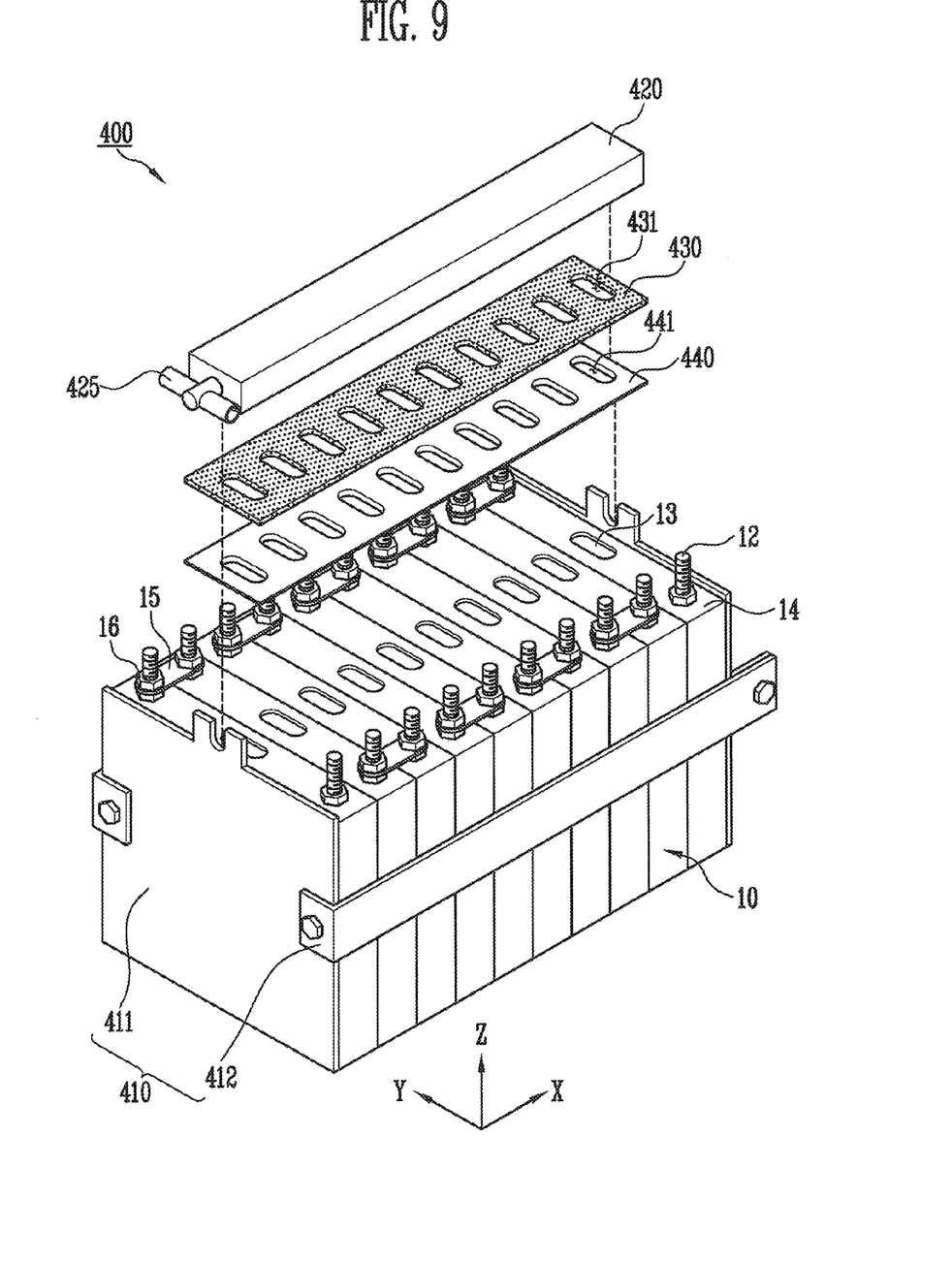
FIG. 9 is an exploded perspective view of the battery module of FIG. 8.

Referring to FIGS. 8 and 9, a battery module 400 according to another embodiment of the present invention includes a plurality of the battery cells 10 aligned in one direction, and each including the cap plate 14 having the positive and negative electrode terminal portions 11 and 12, and the vent portion 13 through which gas may be exhausted; a cover 420 covering the vent portions 13; and a heat-resistance member 440 provided between the battery cells 10 and the cover 420, and having a vent opening 441 formed in a region corresponding to each vent portion 13. In one embodiment, the heat-resistance member 440 has a plurality of the vent openings 441, each of the vent openings 441 being at a region corresponding to one of the vent portions 13. In one embodiment, the heat-resistance member 440 has a same shape as an insulation member 430. Thus, in one embodiment, the heat-resistance member 440 does not cover the entire surface of the cap plate 14, but rather covers a portion of the surface of the cap plate 14.

The cover 420, in one embodiment, has a shape of a hexahedron having one surface open in one direction. The cover 420 is mounted on the battery cells 10 such that the open surface of the cover 420 faces the vent portions 13. In one embodiment, the cover 420 has an exhaust port 425 for exhausting gas, provided at one end thereof. The cover 420 defines a gas flow path connected to the exhaust port 425 by being in close contact with the insulation member 430.

The heat-resistance member 440, according to one embodiment, has a shape covering top surfaces of the battery cells 10. The heat-resistance member 440 may be made of a material including at least one of $Al_2O_3$, $SiO_2$, CaO, MgO, $B_2O_3$, or $Fe_2O_3$. The heat-resistance member 440, in one embodiment, is configured to withstand a temperature of 100 to 1300° C.

Accordingly, in a case in which a high-temperature gas is degassed and exhausted from the vent portion 13 of the battery cell 10, the heat-resistance member 440 prevents or substantially prevents the cover 420 or the insulation member 430 from being damaged or deformed by the high-temperature gas.

A housing 410 accommodating the battery cells 10 therein may include a pair of end plates 411 provided to be spaced apart from each other in one direction, and one or more side brackets 412 connecting the pair of end plates 411 to each other. The plurality of battery cells 10 may be accommodated between the pair of end plates 411.

The end plates 411, in one embodiment, are arranged in surface contact with the outermost battery cells 10, respectively, of the plurality of battery cells 10. Thus, the pair of end plates 411 may apply pressure to the plurality of battery cells 10 toward the inside of the plurality of battery cells 10. The side brackets 412 are connected to the pair of end plates 411 so as to support both surfaces of the plurality of battery cells 10.

Unlike the heat-resistance member 440 described above and shown in FIGS. 1 to 7, the terminal holes 142, 242*a*, 242*b*, 342 are not formed in the heat-resistance member 440 according to one embodiment. Although not shown in the drawings, similar to the partition wall 143 shown in FIG. 3, a partition wall (not shown) may be further provided to the heat-resistance member 440 according to one embodiment. The partition wall, in one embodiment, is formed along the circumference of each vent opening 441 and has a thickness and height (e.g., a predetermined thickness and height). In one embodiment, the heat-resistance member 440 is mounted on the battery cell 10 such that the partition wall faces the vent portion 13. In one embodiment, the partition wall of the heat-resistance member 440 is disposed so as to be adjacent to an opening 431 of the insulation member 430, i.e. to contact the insulation member 430 at an outline of the opening 431. In one embodiment, the partition wall of the heat-resistance member 440 is formed to surround the outline of the opening 431 of the insulation member 430, such that the insulation member 430 does not come in direct contact with the high-temperature gas exhausted from the vent portion 13. Accordingly, it is less likely that the insulation member 430 may be melted.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery module comprising:
a plurality of battery cells aligned in a direction, each of the battery cells comprising a cap plate including a terminal, portion, and a vent portion to exhaust a gas;
a cover covering the vent portions;
a heat-resistance member between the battery cells and the cover, an having an opening formed in a region corresponding to each vent portion; and
an insulation member between the vent portions and the cover,
wherein the heat-resistance member is arranged between the insulation member and the battery cells, and
wherein the heat-resistance member comprises first and second heat-resistance members respectively provided on a top and a bottom of the insulation member.

2. The battery module of claim 1, wherein the cover shape of a hexahedron having one surface open in one direction and is mounted on the battery cells such that the open surface of the cover faces the vent portions.

3. The battery module of claim 2, wherein the cover has an exhaust port connected to a gas flow path at one side of the cover.

4. The battery module of claim 1, wherein the heat-resistance member comprises a partition wall along a circumference of the opening and having a thickness and a height.

5. The battery module of claim 4, wherein the partition wall faces the vent portion.

6. The battery module of claim 1, wherein the heat-resistance member covers top surfaces of the battery cells.

7. The battery module of claim 6, wherein the heat-resistance member includes a terminal hole through which the terminal portion is exposed.

8. The battery module of claim 4, wherein the insulation member has an opening corresponding to the opening of the heat-resistance member, and the partition wall is adjacent to the opening of the insulation member.

9. The battery module of claim 8, wherein the partition wall contacts the insulation member at the opening of the insulation member.

10. A battery module comprising:
a plurality of battery cells aligned in a direction each of the battery cells comprising a cap plate including a terminal portion, and a vent portion to exhaust a gas;
a cover covering the vent portions;
a heat-resistance member between the battery cells and the cover, and having an opening formed in a region corresponding to each vent portion; and
an insulation member between the vent portions and the cover,
wherein the heat-resistance member is arranged between the insulation member and the battery cells,
wherein the heat-resistance member comprises at east one of $Al_2O_3$, $SiO_2$, CaO, MgO, $B_2O_3$, or $Fe_2O_3$, and
wherein the heat-resistance member comprises a partition wall along circumference of the opening and having a thickness and a height.

11. The battery module of claim 10, wherein the cover has a shape of a hexahedron having one surface open in one direction and is mounted on the battery cells such that the, open surface of the cover faces the vent portions.

12. The battery module of claim 11, wherein the cover is in close contact with the insulation member to form a gas flow path.

13. The battery module of claim 12, wherein the cover has en exhaust port connected to the gas flow path at one side of the cover.

14. The battery module of claim 10, wherein the partition wall faces the vent portion.

15. The battery module of claim 10, wherein the heat-resistance member covers top surfaces of the battery cells.

16. The battery module of claim 15, wherein the heat-resistance member includes a terminal hole through which the terminal portion is exposed.

17. The battery module of claim 10, wherein the insulation member has an opening corresponding to the opening of the heat-resistance member, and the partition wall is adjacent to the opening of the insulation member.

18. The battery module of claim 17, wherein the partition wall contacts the insulation member at the opening of the insulation member.

* * * * *